May 6, 1958 P. W. BYRD ET AL 2,833,050
ALIGNING FIXTURE FOR BRUSHES
Filed March 24, 1955 2 Sheets-Sheet 1

INVENTORS
PARKS W. BYRD
JOHN B. SELF JR.

BY A. C. Schwarz Jr.
ATTORNEY

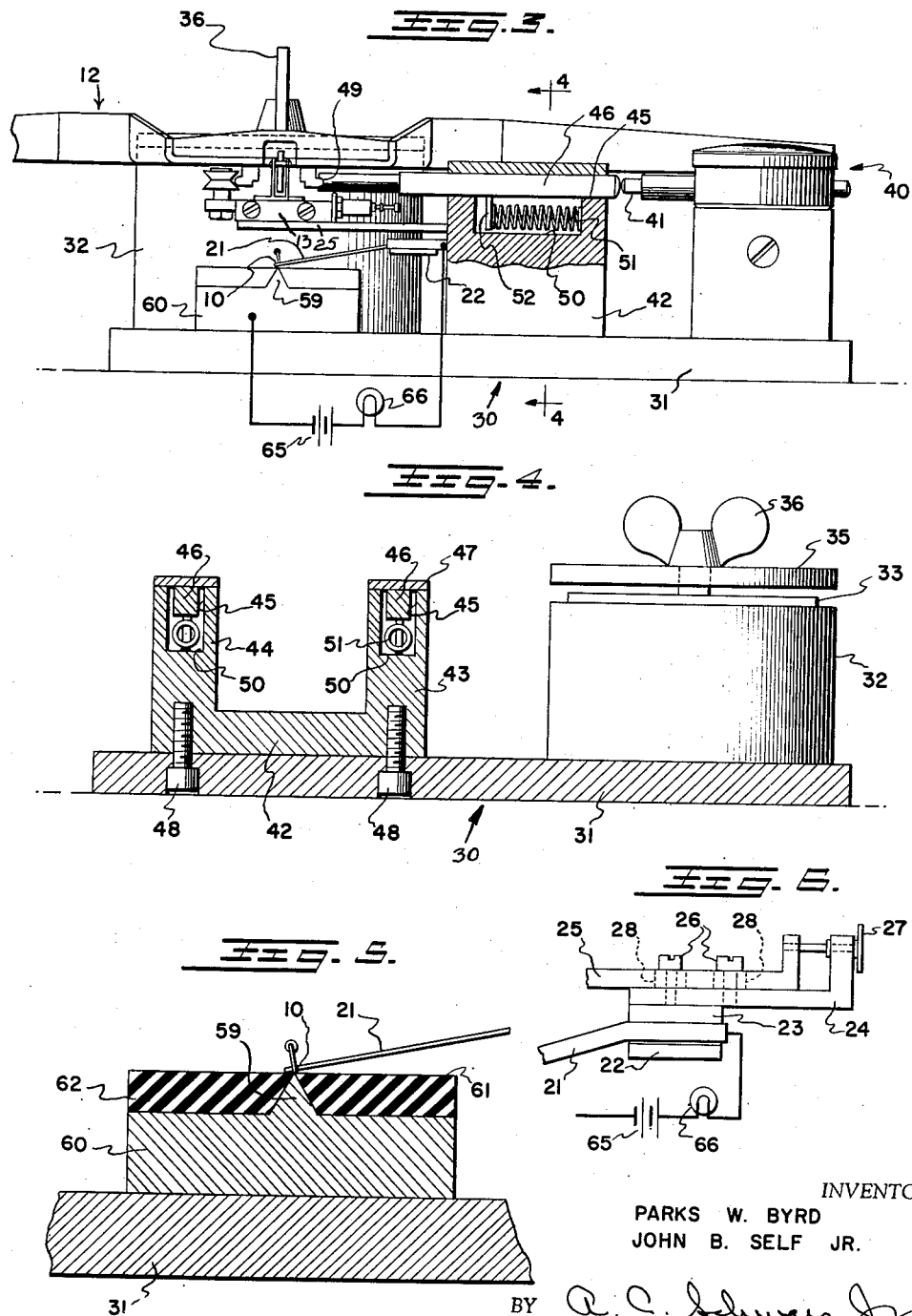

United States Patent Office 2,833,050
Patented May 6, 1958

2,833,050

ALIGNING FIXTURE FOR BRUSHES

Parks W. Byrd and John B. Self, Jr., Winston-Salem, N. C., assignors to Western Electric Company, Incorporated, New York, N. Y., a corporation of New York Application March 24, 1955, Serial No. 496,373

5 Claims. (Cl. 33—180)

This invention relates to aligning gauges, and more particularly, to a gauging device for use in aligning brushes with a carriage which supports them.

In the manufacture of potentiometers it is frequently desirable to mount a plurality of brushes in predetermined spaced relation about the axis of rotation of the movable portion of the potentiometer whereby said brushes may engage the windings of the potentiometer at accurately spaced intervals. In some of these potentiometers the card or insulator on which the potentiometer windings are wound is disposed in a spiral path and the brushes mounted on the arms of a carriage may be reciprocated toward or away from the axis of the carriage as they travel about in contact with the spiral windings thus to conserve space by permitting engagement of the potentiometer brushes with the potentiometer winding through appreciably more than 360°.

In the manufacture of potentiometers of the above type, it is highly desirable to provide brushes which resiliently engage the winding of the potentiometer at precise intervals around the spirally positioned winding.

It is the object of the present invention to provide a simple and highly accurate gauging device for use in aligning brushes.

A more particular object of the present invention is to provide a gauging device which will be easy to manipulate and which will indicate when a brush supporting carriage is in a predetermined rotative position and when a resiliently supported brush is aligned with said position with its effectve surface a predetermined distance from said carriage.

In accordance with one embodiment of the invention, a gauging device is provided for aligning potentiometer brushes with the carriage that supports them which includes a support for rotatably supporting the carriage, a gauging means for indicating when said carriage has been rotated to a predetermined position on the support and a block, spaced a predetermined distance from a given surface of the carriage when the carriage is mounted for rotation in the device, which serves to move the brushes to a position a predetermined distance from a surface of the carriage whereby after the carriage is in a predetermined rotative position, a brush may be adjusted to align with a selected radius of the carriage.

A better understanding of the invention may be had by reference to the accompanying drawings wherein:

Fig. 3 is a side elevation partly in section of the apparatus shown in Fig. 1 on a slightly enlarged scale;

Fig. 4 is a vertical section taken on the line 4—4 of Fig. 3 in the direction of the arrows;

Fig. 5 is an enlarged, vertical section taken substantially along the line 5—5 of Fig. 1 in the direction of the arrows and showing the means for moving the brush to a predetermined distance from the carriage, and Fig. 6 is an enlarged, fragmentary, side elevation of adjusting means for moving the brush with respect to the carriage.

Figure 1:
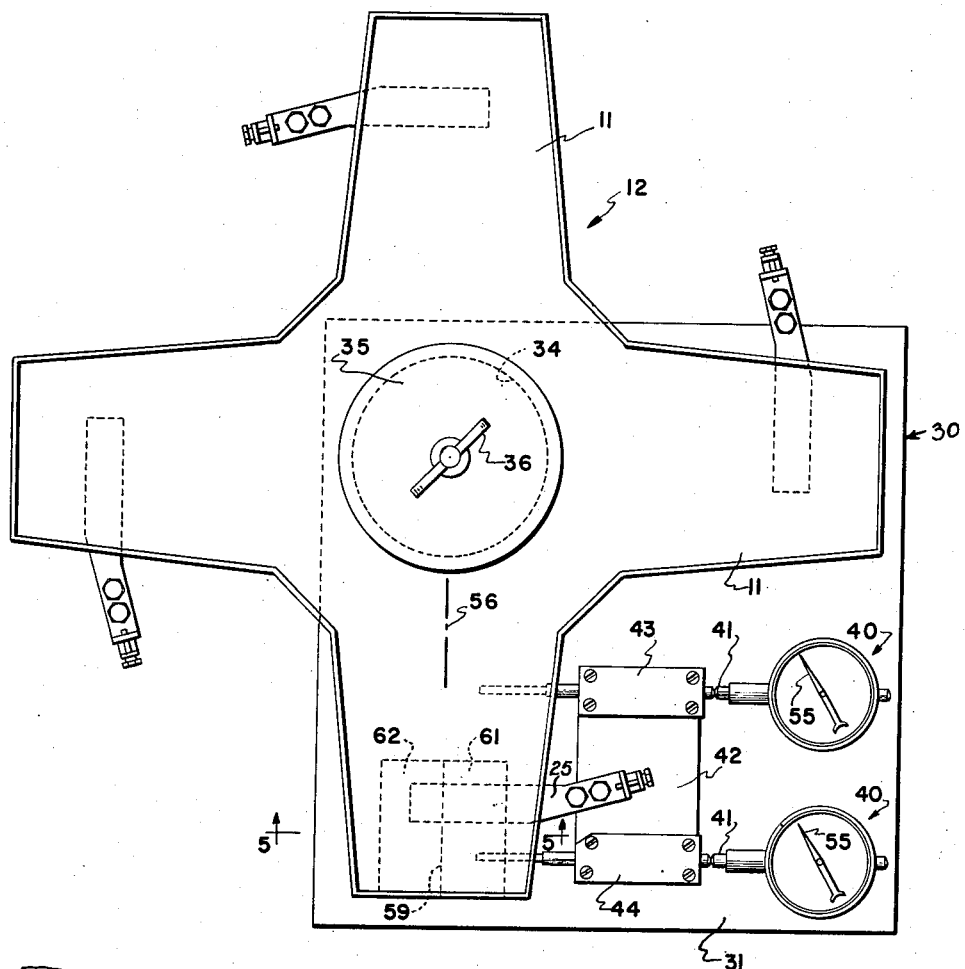
Fig. 1 is a plan view of a fixture embodying the present invention having a brush supporting carriage mounted thereon.
Figure 2:
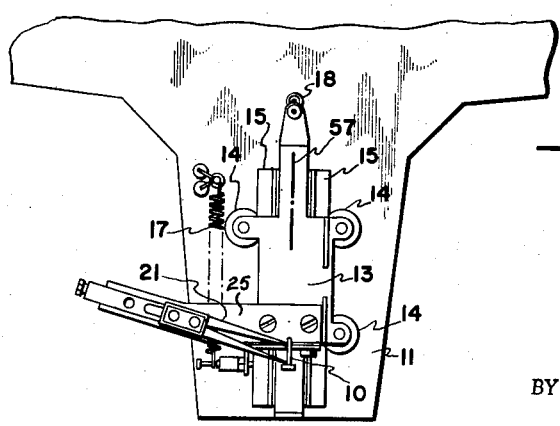
Fig. 2 is a fragmentary view of the under side of one of the arms of said carriage showing a potentiometer brush mounted on said carriage.

A preferred embodiment of the invention is designed for use in aligning the brushes of a potentiometer having a plurality of movable brushes 10 for engagement with windings wrapped around an insulator or card which card in the assembled potentiometer is formed into a spiral, not shown. This spiral comprises, in one form of the potentiometer, 5 revolutions or 1800°. In the operation of a potentiometer of this type, the brushes are moved through a spiral path being carried on the arms 11 of a carriage designated generally by the numeral 12. The brushes are attached to slides 13 which are provided with rollers 14 engaging tracks 15 suitably fixed to each of the arms 11 adjacent the free ends thereof. The slides 13 are normally urged toward the axis of rotation of the carriage by contractile springs 17 and each has at its inner end a roller 18 engaging a suitable cam track. This apparatus is provided with a mechanism, not shown, for lifting the brushes separately from the potentiometer winding when each brush reaches one end of the spiral winding assembly and then shifting the brush back into engagement with the other end of the spiral winding. This apparatus for shifting the brushes, not being essential to an understanding of the present invention, will not be described further, it being sufficient to note that the brush assembly comprises a bifurcated spring 21 carrying the brush 10 at its free end. The furcations of the spring 21 in the operation of the potentiometer straddle the windings of the potentiometer whereby the center point of the brush 10 will be held in engagement with the windings of the potentiometer. The bifurcated spring 21 is, as may best be seen in Fig. 6, fixed in suitable insulators 22, 23 the upper insulator being attached to a mounting bracket 24 which is in turn adjustably connected to a formed plate 25 which is in turn secured to the slide 13. The mounting bracket 24 may be fixed to the formed plate 25 by means of a pair of machine screws 26 after the bracket 24 has been adjusted longitudinally with respect to the formed plate 25. This adjustment may be effected by means of an adjustment screw 27 fixed against longitudinal movement but freely rotatable in bracket 24 and threaded into an upwardly extending projection on the formed plate 25, which permits the bracket 24 to move with respect to the plate 25 because of slots 28 therein through which the screws 26 pass.

From the foregoing it will be apparent that the spring 21 having the brush 10 mounted at its end may be adjusted in a direction toward or away from the longitudinal center line of the slide 13. In potentiometers such as that for which the present gauge is designed it is essential that the brushes 10 be spaced one from another circumferentially with a high degree of accuracy since two of the brushes will at all times be contacting the winding of the potentiometer and consequently the amount of resistance in the winding between the two brushes which are engaging at any given time may be controlled with a degree of accuracy dependent upon the degree of accuracy with which the brushes are spaced one from another about the path which they travel.

Referring now to Figs. 1, 3 and 4, a carriage fixture 30 includes a base 31 provided with a bearing block 32 suitably mounted thereon from which a bearing projection 33 extends. This bearing projection is of a diameter equal to the diameter of a central aperture 34 in the carriage 12 whereby when a carriage 12 is placed upon the bearing block 32, as is shown in Figs. 1 and 3, it may be freely rotated thereon to a desired position and then may be clamped in that position by means of clamping plate 35 and wing nut 36.

In order to align an arm 11 of the carriage 12 in a position where the center line of the slide 13 is in a predetermined rotative position, a pair of dial indicator type micrometers 40 are suitably mounted on the base 31 with their plungers 41 extending in a direction at right angles to the radius which should fall on the center line of the slide 13. Also mounted upon the base 31 is a U-shaped block 42, legs 43 and 44 of which extend upwardly of the block. The block 42 is fixed to the base 31 by means of machine screws 48 which hold the block in position where the legs 43 and 44 thereof extend upwardly in substantial alignment with the plungers 41. Each of said legs has its upper end slotted as shown at 45 to receive contacting plungers 46 which are held in the slots by means of plates 47 suitably secured to the upper ends of the legs 43 and 44. These plungers 46 have square shanks to hold them against rotation in the slots whereby U-shaped notches 49 at the free ends of the plungers 46 will be properly aligned to engage the tracks 15 on which the slides 13 slide. Mounted in a cavity 50 in each of the legs 43 and 44 is a compression spring 51 which bears against the right wall (Fig. 3) of the cavity and also bears against a pin 52 fixed to a plunger 46 to urge the plunger 46 to the left (Fig. 3). The plungers 41 of the micrometer dial indicators engage the right end (Fig. 3) of the plungers 46 and when the plungers 46 are moved against the action of the springs 51, that is to the right (Fig. 3), the needles 55 on the dial indicators will be rotated from their normal position. The plungers 46 and the dial indicators may be adjusted so that when the notches 49 at the ends of the plungers 46 have their bases exactly parallel to the radial line which would coincide with the center line of the slide 13, the needles will both point to exactly the same graduation on the indicator. Thus, after a carriage has been suitably placed upon the carriage fixture 30 and rotated to a position where one of its slides 13 will be approximately in the desired position, as indicated by the radius line 56 being in a plane coincident with the center line 57 of the slide, the two needles should point to the same graduation on the dials of the dial indicators. It will be apparent from the foregoing that if the carriage is rotated clockwise beyond this position, the plunger 46 in the leg 44 will move to the left, Fig. 1, at a much greater rate of speed than the plunger in leg 43, and consequently, the angular positions of the needles 50 in dial indicators 40 will not point to the same graduation. The opposite indication may be observed if the carriage is rotated out of the desired position in a counterclockwise direction.

After a carriage has been properly located as indicated by the two needles pointing at exactly the same angle, the carriage may be locked in place by manipulating the thumb nut 36 which will clamp the clamp plate 35 tightly against the carriage to hold it in that position. After the carriage has been thus positioned with the center line of one of its slides 13 in the desired predetermined position, the adjustment screw 27 may be manipulated to bring the brushes 10 into contact with the tip 59 of a block of metal 60 such as is shown in Figs. 3 and 5. This tip is formed so as to provide substantially a line contactor between two blocks 61 and 62 of insulating material suitably fixed to the block 60. The block 60 is connected through suitable conductors to one side of a source of current 65. The other side of the current source is connected through a lamp 66 to the terminal end of the spring 21 whereby when the mounting block 24 has been adjusted with respect to the formed plate 25 by manipulating the adjustment screw 27 to the point where the brush 10 on the end of the spring 21 carried by the mounting block 24 contacts the tip 59, the consequent lighting of the lamp 66 will indicate that the brush 10 has been brought to its proper predetermined position whereupon machine screws 26 may be tightened to secure the bracket 24 in fixed position with respect to the formed plate 25.

After the brush 10 has caused the lamp 66 to be illuminated to indicate proper positioning, and after the machine screws 26 have been tightened, the slide 13 may be moved along the tracks 15 by virtue of the rollers 14 to determine if the brush 10 remains in point contact with the conducting tip 59 of the block 60 to maintain the light 66 illuminated. It may be seen in Fig. 1 that the block 60 and the tip 59 extend some length.

It can be seen then, that with the present invention, each brush 10 can be placed at the critical point necessary for the correct operation of the apparatus in which the brushes are used. Not only is each brush 10 moved to its correct rotative position on the center line 56 of the carriage 12, as indicated by the energizing of the lamp 66, but also the height of the surface defined by the blocks 61 and 62 on the block 60 places each brush 10 at a predetermined distance from the carriage 12 when the brush is at the correct rotative position. Further, if each brush 10 remains in contact with the conducting strip 59 as the slide 13 is moved along the tracks 15, the continuous energization of the lamp 66 will indicate that the brush 10 is at all times along the center line 56.

Although the invention has been described in connection with a specific type of brush assembly, it will be understood that various embodiments thereof may be made for use in connection with other types of equipments without departing from the scope of the invention.

What is claimed is:

1. A fixture for aligning a brush with respect to a carriage on a surface of which the brush is mounted adjustably, which comprises means for mounting the carriage rotatably, means engageable with the carriage for indicating when the carriage is in a predetermined rotative position, and means spaced a predetermined distance from the carriage surface for engagement with the brush and for indicating the alignment of the brush with respect to the predetermined rotative position.

2. A fixture for aligning a brush with respect to a carriage therefor wherein the brush is mounted adjustably on a surface of the carriage, which comprises means for mounting the carriage rotatably, means for indicating when the carriage is in a predetermined rotative position, said indicating means including a pair of gauges mounted for engagement with the carriage and in a plane parallel to the predetermined rotative position, and means spaced a predetermined distance from the carriage surface for engaging the brush and for indicating the alignment of the brush with respect to the rotative position.

3. A fixture for aligning a brush with respect to a carriage on a surface of which the brush is mounted adjustably, which comprises means for mounting the carriage rotatably, means for clamping the carriage in a predetermined rotative position, a pair of gauges mounted parallel to the rotative position for engagement with the carriage and for indicating when the carriage is in such rotative position, means for deflecting the brush a predetermined distance from the surface of the carriage when the carriage is in the predetermined rotative position, and means for indicating that the brush is in the desired position with respect to its distance from the carriage and along the rotative position.

4. A fixture for aligning a brush with respect to a carriage on a surface of which the brush is mounted adjustably, which comprises bearing means for supporting the carriage rotatably, means for clamping the carriage in a predetermined rotative position, a pair of gauges mounted parallel to the rotative position for engaging the carriage and indicating when the carriage is in such predetermined position, a block of insulating material having a surface thereon spaced a predetermined distance from the surface of the carriage for engagement by the brush and for placing the brush a predetermined distance from the carriage surface, an indicating circuit, and a narrow strip of conductive material secured within the block surface along the predetermined rotative position for engaging the brush and energizing the indicating circuit when the brush is adjusted to the rotative position.

5. A fixture for aligning a brush with respect to a carriage on a surface of which the brush is mounted adjustably, which comprises a base, bearing means mounted on the base for supporting the carriage rotatably, a clamp associated with the bearing means for securing the carriage in a predetermined rotative position, a pair of gauging devices mounted in spaced relation on the base and having gauging plungers the ends of which are in a plane parallel to the predetermined rotative position, the plungers engaging the carriage and indicating when the carriage is in the predetermined rotative position, a block of insulating material mounted on the base and having a surface spaced a predetermined distance from the surface of the carriage, an indicating circuit, and a narrow strip of conductive material extending across the insulating block surface for engaging the brush electrically and energizing the indicating circuit when the brush is in its correct position.

References Cited in the file of this patent

UNITED STATES PATENTS

| | | |
|---|---|---|
| 1,579,291 | Emery | Apr. 6, 1926 |
| 2,450,897 | Krueger | Oct. 12, 1948 |
| 2,556,760 | John | June 12, 1951 |